United States Patent [19]
Back

[11] Patent Number: 5,177,601
[45] Date of Patent: Jan. 5, 1993

[54] APPARATUS FOR SELECTIVELY DAMPENING NOISES CONTAINED IN Y SIGNAL FOR A VIDEO SIGNAL PROCESSISNG SYSTEM

[75] Inventor: Dong-Cherl Back, Suweon, Rep. of Korea

[73] Assignee: Samsung Electronics Co., Ltd., Suwon, Rep. of Korea

[21] Appl. No.: 715,601

[22] Filed: Jun. 14, 1991

[30] Foreign Application Priority Data

Aug. 30, 1990 [KR] Rep. of Korea .................... 90-13521

[51] Int. Cl.$^5$ .............................................. H04N 5/21
[52] U.S. Cl. ...................................... 358/167; 358/36
[58] Field of Search .................... 358/36, 167, 39, 166

[56] References Cited

U.S. PATENT DOCUMENTS

| | | | |
|---|---|---|---|
| 4,090,221 | 5/1978 | Connor | 358/166 |
| 4,335,400 | 6/1982 | Chow | 358/167 |
| 4,807,032 | 2/1989 | Strehl | 358/166 |
| 4,851,911 | 7/1989 | Muller | 358/167 |
| 4,882,618 | 11/1989 | Tsuji | 358/167 |
| 4,985,771 | 1/1991 | Sugimori | 358/167 |
| 5,019,908 | 5/1991 | Su | 358/167 |

FOREIGN PATENT DOCUMENTS 210774 11/1984 Japan .................................... 358/167

*Primary Examiner*—Tommy P. Chin
*Attorney, Agent, or Firm*—Robert E. Bushnell

[57] ABSTRACT

An apparatus for selectively dampening noises of received luminance signals for a video signal processing system. The apparatus comprises a level limiter for limiting amplitude levels of the luminance signals, a noise dampening processor connected to the level limiter, for dampening noises of the luminance signals resulted from a transmission channel to provide processed luminance signals, a buffer connected to the level limiter, for buffering the luminance signals to provide buffered luminance signals, an average detector for detecting average amplitude levels of the luminance signals to provide an average signal, a comparator for comparing the average signal to a reference signal to provide a control signal, a switch selector for selecting one of the control signal and an user'selected signal to provide a selected control signal, and a switch for enabling transmission of one of the processed luminance signals and the buffered luminance signals in dependence upon reception of the selected control signal.

10 Claims, 3 Drawing Sheets

APPARATUS FOR SELECTIVELY DAMPENING NOISES CONTAINED IN Y SIGNAL FOR A VIDEO SIGNAL PROCESSISNG SYSTEM

TECHNICAL BACKGROUND

The present invention concerns a noise dampening apparatus for a video signal processing system, and more particularly an apparatus for not only automatically dampening noises contained in the luminance signal (Y signal), but also enabling the user to selectively dampen the noises.

Generally, the luminance signal Y of the three primary color (R,G,B) signals combined with the chrominance signal contains the noises of the transmission channel, so that it is difficult to reproduce the original image. Under such a circumstance, the noises contained in the Y signal are removed by using a noise dampening apparatus in the receiving end. Moreover, the Y signal has visual characteristics very susceptible to the eye, which requires to be properly treated.

Referring to FIG. 1 for illustrating a conventional noise dampening apparatus, the level of the Y signal received through input terminal 1H is adjusted by a resistor R1, and the noises contained in the Y signal are removed by a noise dampening processor 20. Then the Y signal is delivered through a resistor R2 to an output terminal 2H connected with a video signal output means.

If the user changes the connecting position of a switch 4 from "1" to "2", the Y signal is delivered through a buffer 3 and resistor R2 to the output terminal 2H. Namely, the Y signal is directly sent to the output terminal not passing the noise dampening processor 20. In this case, it is virtually impossible for the user to properly select the position of the switch according to the received video signal in order to dampen the noises.

SUMMARY OF THE INVENTION

It is an object of the present invention to provide an apparatus for selectively dampening the noises contained in the Y signal that automatically selects a noise dampening processor or a buffer according to the state of the video signal.

It is another object of the present invention to provide an apparatus for dampening the noises that may be selected by the user.

It is still another object of the present invention to provide means for preventing the degradation of the video signal by selectively controlling the Y signal.

According to the present invention, there is provided an apparatus for selectively dampening noises contained in Y signal for a video signal processing system comprising a level limiting means for limiting the level of the Y signal, a noise dampening processor for dampening the noises of a transmission channel from the output signals of the level limiting means, a buffer for buffering the output signals of the level limiting means so as to selectively produce the output signals, a switching means for connecting with the noise dampening processor or buffer according to logic state, an averaging means for producing the value of luminance according the output signals of the level limiting means, a comparator for comparing the output signals of the averaging means to a reference value, and a switch selector for controlling the switching means according to the logical state of the output signal of the comparator.

The present invention will now be described more specifically with reference to the drawings attached only by way of example.

BRIEF DESCRIPTION OF THE ATTACHED DRAWINGS

DETAILED DESCRIPTION OF A CERTAIN PREFERRED EMBODIMENT

Figure 1:
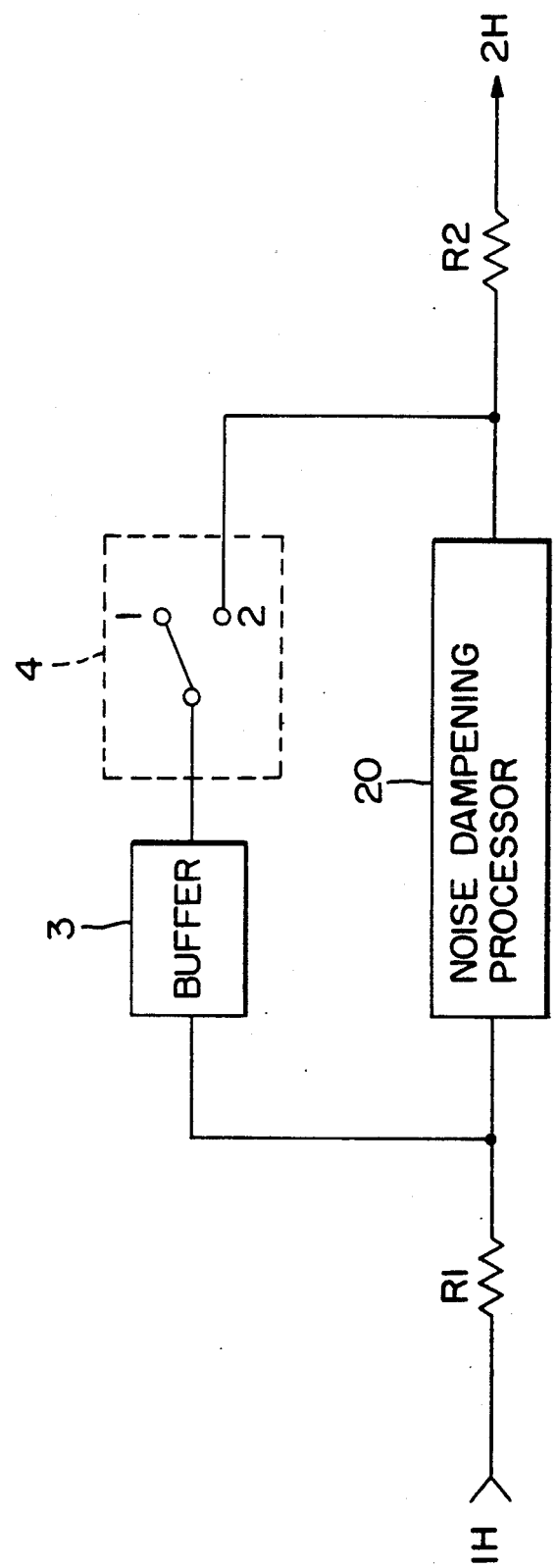
FIG. 1 is a block diagram for illustrating a conventional noise dampening apparatus.
Figure 2:
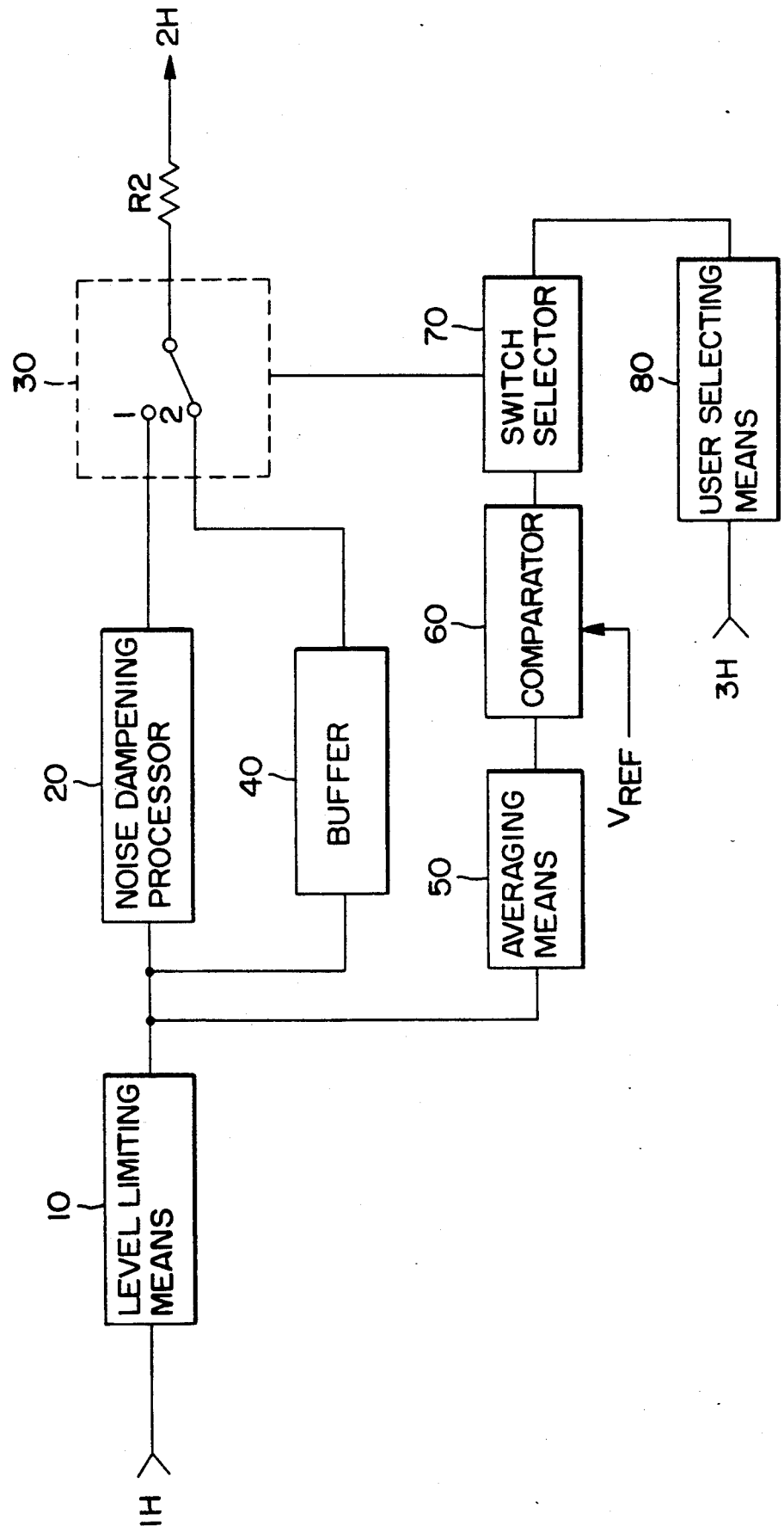
FIG. 2 is a block diagram for illustrating a noise dampening circuit according to the present invention.

Referring to FIG. 2, an apparatus for selectively dampening noises contained in the Y signal comprises a level limiting means 10, noise dampening processor 20, buffer 40, switching means 30, averaging means 50, comparator 60, switch selector 70, and user selecting means 80.

The level limiting means 10 limits the level of the Y signal received through an input terminal 1H. The noise dampening processor 20 dampens the noises of a transmission channel from the output signals of the level limiting means 10. The buffer 40 buffers the output signals of the level limiting means 10 so as to selectively produce the output signals. The switching means 30 connects with the noise dampening processor 20 or buffer 40 according to logic state. The averaging means 50 produces the value of luminance according the output signals of the level limiting means 10. The comparator 60 compares the output signals of the averaging means 50 to a reference value. The switch selector 70 controls the switching means 30 according to the logical state of the output signal of the comparator 60. The user selecting means 80 controls the switching means 30 according to the user's control signal received through an input terminal 3H from a microcomputer independently with the switch selector 70. The Y signal is produced through the switching means 30 and a resistor R2 to an output terminal 2H.

The switch selector 70 comprises a first switching transistor Q1 with the base connecting with the output signals of the comparator (60), a capacitor C3 connected between the base of the first switching transistor Q1 and ground for filtering off high frequency component, a first resistor R3 connected between the capacitor C3 and comparator 60 for applying current to the base of the first switching transistor Q1, and a second resistor R4 for applying power source voltage Vcc to the collector of the first switching transistor Q1.

The user selecting means 80 comprises a second switching transistor Q2 with the base connecting with the input terminal 3H for controlling the switching means 30 by the collector current, a capacitor C5 connected between the base of the second switching transistor Q2 and ground for filtering off high frequency component, a third resistor R5 connected between capacitor C5 and input terminal 3H for applying current to the base of the second switching transistor Q2.

Figure 4:
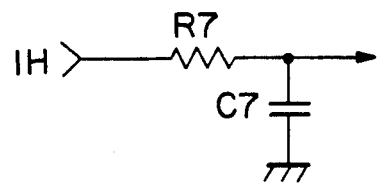
FIG. 4 illustrates a circuit for a level limiting means (10) according to FIG. 2.

Referring to FIG. 4, the level limiting means 10 comprises a resistor R7 for levelling the Y signal received through the input terminal 1H and a capacitor C7. The resistor R7 and capacitor C7 are connected in series.

Figure 5:
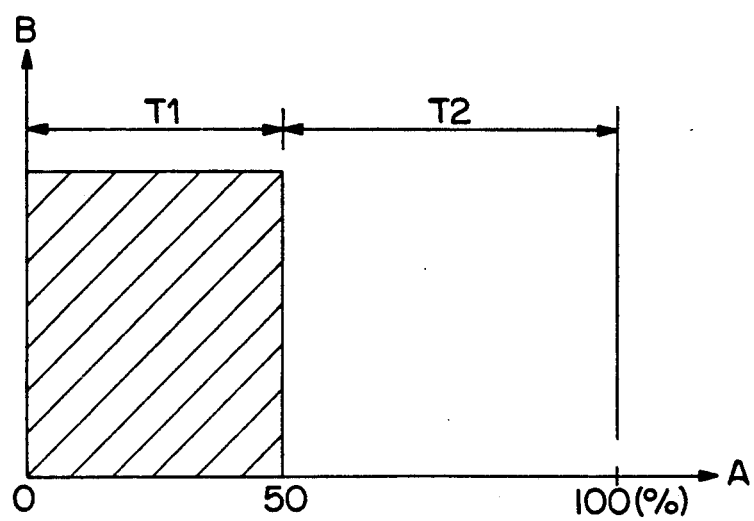
FIG. 5 is a diagram of the Y signal for illustrating the switch selector (70) according to FIG. 2.

In FIG. 5, the transverse axis (A) indicates the level in the range from black to white in percentage, whereas the longitudinal axis (B) indicates the amount of the noises dampened. In this case, the switch selector 70 is made to automatically operate the switching means 30 about the level of 50% in the transverse axis (A), so that the Y signal may be selectively obtained through the noise dampening processor 20 or buffer 40.

With reference to FIGS. 2-5, the operation of the inventive circuit will now be described in detail.

The Y signal received through the input terminal 1H is levelled by the resistor R7 and capacitor C7 of the level limiting means 10. The resistor R7 limits the Y signal within a specified value, while the capacitor C7 filters off the high frequency component of the Y signal.

The Y signal from the level limiting means 10 is applied simultaneously to the noise dampening processor 20, buffer 40 and averaging means 50. The averaging means 50 comprises a conventional integrating circuit producing the average value of the luminance of the Y signal.

Figure 3:
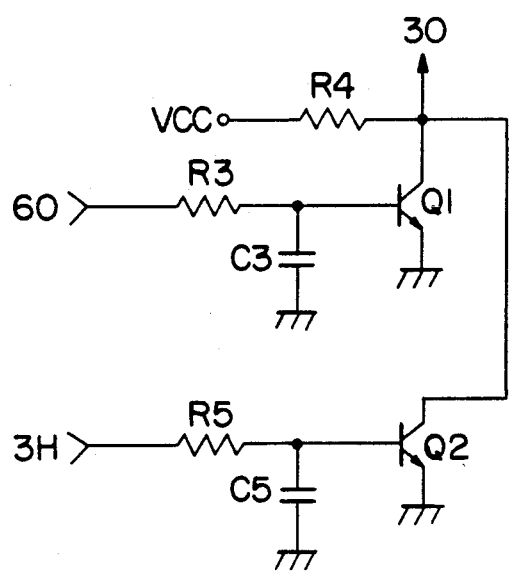
FIG. 3 illustrates circuits for a switch selector (70) and user selecting means (80)

The comparator 60 compares the Y signal received from the averaging means 50 with an internally established reference value in order to produce the difference therebetween. Here, it is assumed that the output signal of the comparator 60 is logically low or high according to whether the value of the Y signal from the averaging means 50 is within the interval T1 or T2. If the output signal of the comparator 60 is within the interval T2, the first switching transistor Q1 of FIG. 3 is turned on so as to make the switching means 30 to select the position "2" as shown in FIG. 2. Consequently, the Y signal is delivered through the buffer 40 to the output terminal 2H not passing the noise dampening processor 20.

Meanwhile, if the output signal of the comparator 60 is within the interval T1 in FIG. 5 and thus logically low, the first switching transistor Q1 of the switch selector 70 is turned off so as to make the switching means 30 to select the position "1". Thus, the Y signal is delivered through the noise dampening processor 20 to the output terminal 2H, so that the noises are dampened.

The operational modes of the switching means 30 may be arbitrarily determined, e.g., it is assumed in the present embodiment that the positions "2" and "1" respectively indicate the on and off of the first switching transistor Q1.

In the switch selector 70, the capacitor C3 filters off the high frequency component of the Y signal, while the resistor R3 is to apply current to the base of the first switching transistor Q1. Thus the switch selector 70 causes the Y signal to be delivered selectively through the noise dampening processor 20 or buffer 40 to the output terminal 2H according to the output state of the comparator 60.

Meanwhile, the user selecting means 80 allows the user to arbitrarily pass the Y signal through the noise dampening processor 20 or buffer 40 independently with the switch selector 70, which is accomplished by the second switching transistor Q2 shown in FIG. 3. Namely, if the user desires to put the switching means 30 into the mode "2" independently with the switch selector 70, he generates a "logic high" signal by means of the microcomputer. Then, the signal is delivered through the input terminal 3H to the user selecting means 80, which subsequently turns on the second switching transistor Q2 of FIG. 3, thus making the switching means 30 to select the mode "2" as shown in FIG. Hence, the Y signal is delivered through the buffer 40.

The resistor R5 and capacitor C5 of the user selecting means 80 perform the same functions with the resistor and capacitor of the switch selector 70. The resistor R4 is to apply power supply voltage to the collectors of the first and second switching transistors Q1-Q2.

As stated above, the inventive apparatus makes it possible not only to automatically dampen the noises contained in the Y signal according to the state of the video signal, but also for the user to arbitrarily select the dampening function.

What is claimed is:

1. An apparatus for selectively dampening noises in luminance signals for a video signal processing system, comprising:

level limiter means for limiting amplitude levels of the luminance signals from an input terminal to provide limited luminance signals;

noise dampening processor means for dampening noises of said limited luminance signals to provide processed luminance signals;

buffer means for buffering said limited luminance signals to provide buffered luminance signals;

switching means for enabling transmission of one of said processed luminance signals and said buffered luminance signals in dependence upon reception of a control signal;

average detector means for detecting amplitude levels of said limited luminance signals to provide average luminance signals;

comparator means for comparing said average luminance signals to a reference signal to provide a compared signal; and switch selector means for providing the control signal to control said switching means according to the compared signal.

2. The apparatus for selectively dampening noises as claimed in claim 1, wherein said level limiter means is a RC circuit.

3. The apparatus for selectively dampening noises as claimed in claim 1, wherein said switch selector means comprises a first switching transistor having a base coupled to receive the compared signal via a first resistor, a capacitor interposed between the base of said first switching transistor and ground, for filtering high frequency components from the compared signal, and a second resistor for applying power source voltage to a collector of said first switching transistor.

4. An apparatus for selectively dampening noises in luminance signals for a video signal processing system, comprising:

level limiter means for limiting amplitude levels of the luminance signals received from an input terminal;

noise dampening processor means connected to said level limiter means, for dampening the noises of the luminance signals as result from a transmission channel to provide processed luminance signals;

buffer means for buffering the output luminance signals from said level limiter means to provide buffered luminance signals;

switching means for enabling transmission of one of said processed luminance signals and said buffered luminance signals in dependence upon reception of a selected control signal;

average detector means for detecting amplitude levels of the output luminance signals from said level limiter means to provide an average luminance value of said output luminance signals;

comparator means for comparing said average luminance value to a reference value to provide a first control signal;

first selector means for provide a second control signal selected by a user for controlling said switching means; and second selector means for making a selection between one of said first and second control signal to provide said selected control signal to control said switching means.

5. The apparatus for selectively dampening noises as claimed in claim 4, wherein said level limiter means is a RC circuit.

6. The apparatus for selectively dampening noises as claimed in claim 4, wherein said switch selector means comprises a first switching transistor having a base coupled to receive the compared signal via a first resistor, a capacitor interposed between the base of said first switching transistor and ground, for filtering high frequency components from the compared signal, and a second resistor for applying power source voltage to a collector of said first switching transistor.

7. The apparatus for selectively dampening noises as claimed in claim 4, wherein said first selector means comprises a second switching transistor having a base coupled to receive a command signal selected by a user via a first resistor, a capacitor interposed between the base of said second switching transistor and ground.

8. A video noise reduction circuit, comprising:
means for receiving video signals from a transmission channel;
level limiter means for removing high frequency components from said video signals to provide limited signals;
noise dampening processor means for dampening noises of said limited signals resulted from said transmission channel to provide processed signals;
buffer means for buffering said limited signals to provide buffered signals;
switching means for enabling transmission of one of said processed signals and said buffered signals in dependence upon reception of a control signal;
average detector means for determining amplitude levels of said limited signals to provide an average value;
comparator means for comparing said average value of said limited signals to a reference value to provide a compared signal; and
switch selector means for providing said control signal to operate said switching means in dependence upon reception of said compared signal and a command signal representative of a user's selected signal for enabling transmission of one of said processed signals and said buffered signals.

9. The video noise reduction circuit as claimed in claim 8, wherein said level limiter means is a RC circuit.

10. The video noise reduction circuit as claimed in claim 8, wherein said switch selector means comprises:
a first transistor having a base coupled to receive said command signal via a first RC circuit, a collector coupled to receive an internal power voltage, and an emitter connected to ground;
a second transistor having a base coupled to receive said compared signal via a second RC circuit for filtering high frequency components from said compared signal, a collector coupled to receive said internal power voltage, and an emitter connected to ground; and
an output terminal formed at a junction of the bases of said first and second transistors for providing the control signal.

* * * * *